(12) United States Patent
Saiz

(10) Patent No.: US 6,394,389 B1
(45) Date of Patent: May 28, 2002

(54) AIRCRAFT LIFT ARRANGEMENT

(76) Inventor: Manuel Munoz Saiz, San Emilio 16, 1, 3, Madrid 28017 (ES)

( * ) Notice: Subject to any disclaimer, the term of this patent is extended or adjusted under 35 U.S.C. 154(b) by 0 days.

(21) Appl. No.: 09/479,287

(22) Filed: Jan. 6, 2000

Related U.S. Application Data

(63) Continuation-in-part of application No. 09/095,957, filed on May 4, 1998, now Pat. No. 6,082,668, and a continuation-in-part of application No. 09/127,476, filed on Jul. 31, 1998, now Pat. No. 6,053,453.

(30) Foreign Application Priority Data

| Sep. 6, 1996 | (ES) | 9601904 |
| Nov. 10, 1999 | (ES) | 9902451 |
| Sep. 7, 2001 | (ES) | 9802126 |

(51) Int. Cl.7 .................................................. B64C 5/06
(52) U.S. Cl. ........................................................ 244/91
(58) Field of Search ..................... 244/54, 55, 53 R, 244/87, 91, 137.4, 37, 105, 108; 89/1.54

(56) References Cited

U.S. PATENT DOCUMENTS

| 3,387,802 | A | * | 6/1968 | Cruz | |
| 4,008,645 | A | * | 2/1977 | Herbert | 89/1.5 R |
| 4,026,502 | A | * | 5/1977 | Masclet | 244/108 |
| 4,301,980 | A | * | 11/1981 | Bradfield et al. | 244/12.5 |
| 4,500,055 | A | * | 2/1985 | Krojer | 244/55 |
| 4,629,147 | A | * | 12/1986 | Johnson, Jr. et al. | 244/55 |
| 4,679,751 | A | * | 7/1987 | Peterson | 244/137.4 |
| 5,374,010 | A | * | 12/1994 | Stone et al. | 244/12.5 |
| 5,711,494 | A | * | 1/1998 | Saiz | 244/12.1 |
| 5,810,292 | A | * | 9/1998 | Garcia, Jr. et al. | 244/135 A |
| 5,842,666 | A | * | 12/1998 | Gerhardt et al. | 244/15 |
| 5,957,405 | A | * | 9/1999 | Willaims | 244/15 |
| 6,126,113 | A | * | 10/2000 | Navickas | 244/120 |

* cited by examiner

Primary Examiner—Peter M. Poon
Assistant Examiner—Kevin Jakel
(74) Attorney, Agent, or Firm—Robert M. Schwartz

(57) ABSTRACT

An aircraft lift arrangement that involves giving the fins or vertical elements, a positive angle slope in relation to their forward edge or transverse axis both on the leading and trailing edges, both beginning at the upper front and descending in an incline rearward as far as the base, to produce an inclined force on said vertical element which is broken down into two components, one horizontal and rearward, providing resistance to the advance, and the other a vertical, ascendant or lift component.

10 Claims, 2 Drawing Sheets

AIRCRAFT LIFT ARRANGEMENT

CROSS REFERENCES TO RELATED APPLICATONS

This patent claims the priority date of Spanish Patent P9902451 filed on Nov. 10, 1999. The basis for priority in this case is the Paris Convention for the Protection of Industrial Property (613 O.G. 23, 53 Stat 1748). The Spanish patent application was filed in the Official Patent and Trademark Office of Spain.

This patent application is a continuation-in-part of U.S. patent application 09/095,957, filed on May 4, 1998, now U.S. Pat. No. 6,082,668 and U.S. patent application 09/127,476, filed on Jul. 31, 1998 now U.S. Pat. No. 6,053,453.

BACKGROUND OF THE INVENTION

1. Field of the Invention

On vertical aircraft fins or projections.

2. Descrption of the Related Art

This patent is a partial continuation of Patents Nos. P9601904 and P9701753: current fins or vertical elements are inclined against the transversal axis to produce a downward force which reduces aircraft lift, all of which is corrected with the present invention.

BRIEF SUMMARY OF THE INVENTION

The aircraft lift arrangement involves giving the fins or vertical elements, engine pylons and lateral portions of their cowls, fin units, and launcher-tank, rocket, floats and skis mounts, struts or brackets, external cables and antennas a positive angle slope in relation to their forward edge or transverse axis both on the leading and trailing edges, both beginning at the upper front and descending in an incline rearward as far as the base, to produce an inclined force on said vertical element which is broken down into two components, one horizontal and rearward, providing resistance to the advance, and the other a vertical, ascendant or lift component.

This provides a twin benefit, on the one hand eliminating the downward force and on the other generating an upward force or lift of the same value. In other cases, this arrangement both generates lift and simultaneously reduces forward resistance.

The leading edge of these fins, mounts, etc. creates greater lift that the trailing edge with the same inclination.

The lift generated is generally high as such fins or vertical elements require a certain thickness in order to fulfil their aerodynamic profile role as well as to house ducting or control elements, etc., so that their cross-section or front area is greater.

It may also be used in sideways sloping fins.

Given the foregoing, it is advisible wherever feasible to use vertical fins or elements rather than horizontal types with this arrangement.

Advantages: on increasing its lift, its efficiency increases, it is simple and inexpensive.

BRIEF DESCRIPTION OF THE DRAWIGS

DETAILED DESCRPTION OF THE INVENTION

Figure 1:
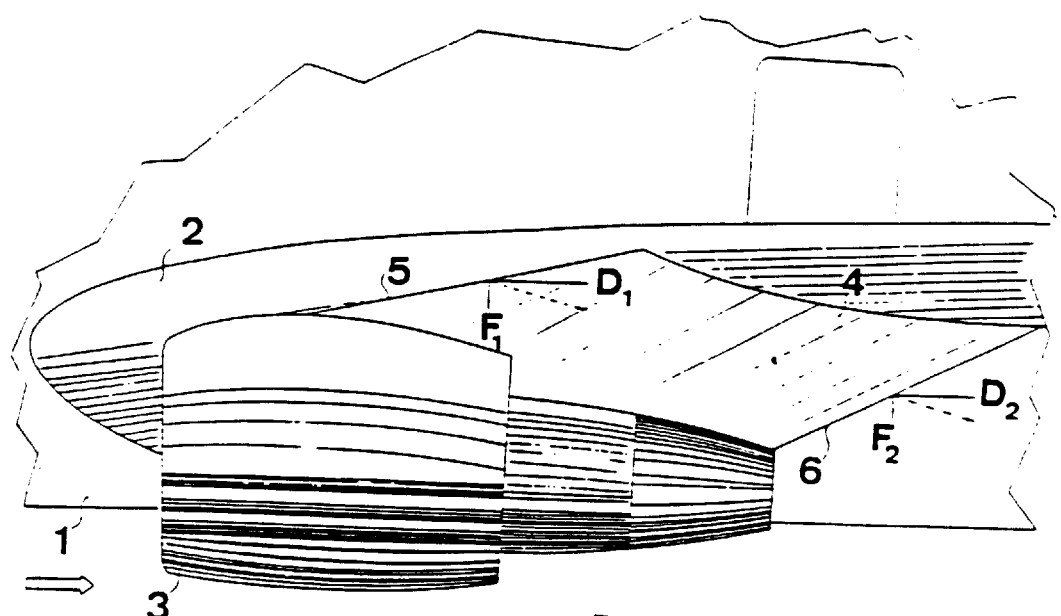
FIG. 1 shows a partial side view of an aircraft without the arrangement of this invention.

FIG. 1 shows the prior art that refers to an aircraft engine that consists of the aircraft fuselage 1, the wing 2, the engine cowl 3, the pylon 4, the downward force $F_1$ and the resistance $D_1$ of the leading edge 5 and the downward force $F_2$ and the resistance $D_2$ of the trailing edge 6. Downward forces are the present drawbacks. Downward forces are the present drawbacks.

Figure 2:
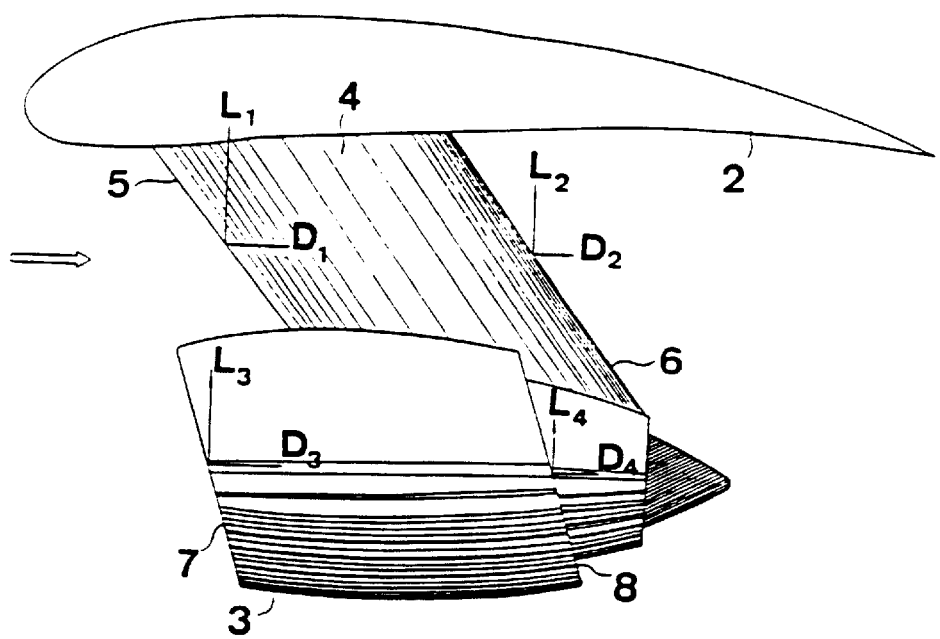
FIG. 2 shows a squematic, partial, side view of an aircraft with the arrangement of this invention.

FIG. 2 consists of the wing 2, the engine cowl 3, the pylon 4, the lift $L_1$ and the resistance $D_1$ of the leading edge 5 and the lift $L_2$ and resistance $D_2$ of the trailing edge 6 where the lift $L_3$ and the resistance $D_3$ of the side leading edges 7 and the lift $L_4$ and the resistance $D_4$ of the cowl trailing edge 8, both beginning at the upper front and descending in an incline rearward as far as the base, to produce an inclined force on said vertical element which is broken down into two components, one horizontal and rearward, providing resistance to the advance, and the other a vertical, ascendant or lift component.

Figure 3:
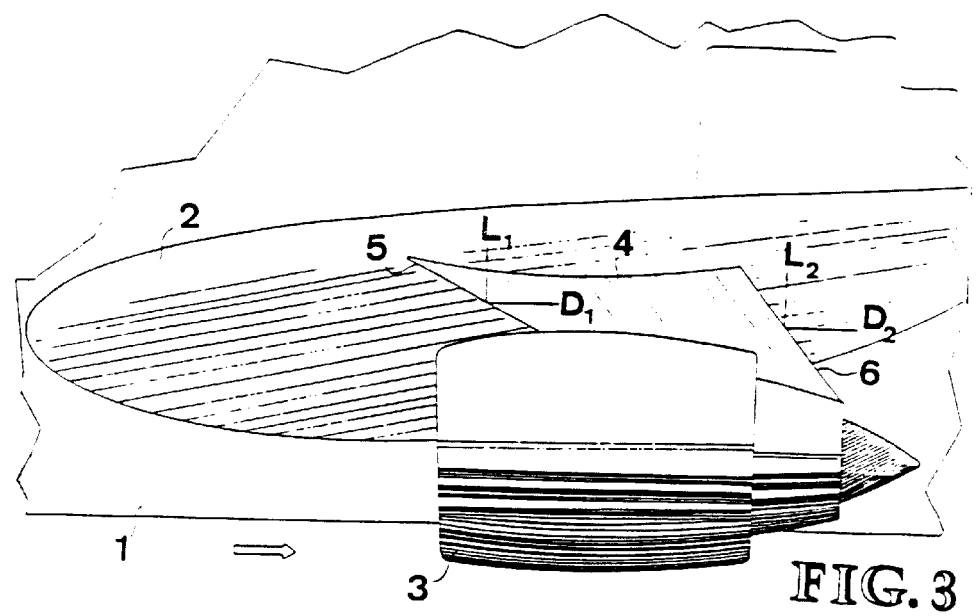
FIGS. 3 to 5 show squematic, partial, side views of several variants.

FIG. 3 consists of the fuselage 1, the wing 2, the pylon 4, the lift $L_1$ and the resistance $D_1$ of the leading edge 5 and the lift $L_2$ and the resistance $D_2$ of its trailing edge 6, it only shows the improvement on the pylon.

Figure 4:
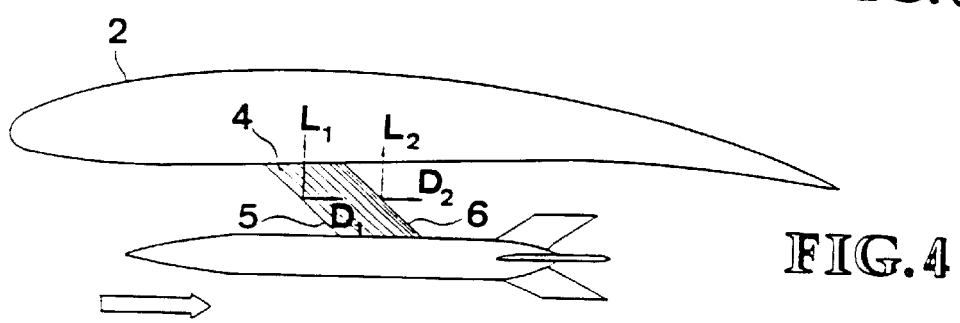

FIG. 4 consists of the wing 2, the rocket mount 4, the lift $L_1$ and the resistance $D_1$ of the leading edge 5 and the lift $L_2$ and the resistance $D_2$ of the trailing edge 6. This arrangement is also typical with launcher-tank, rocket, floats and skis mounts etc.

Figure 5:
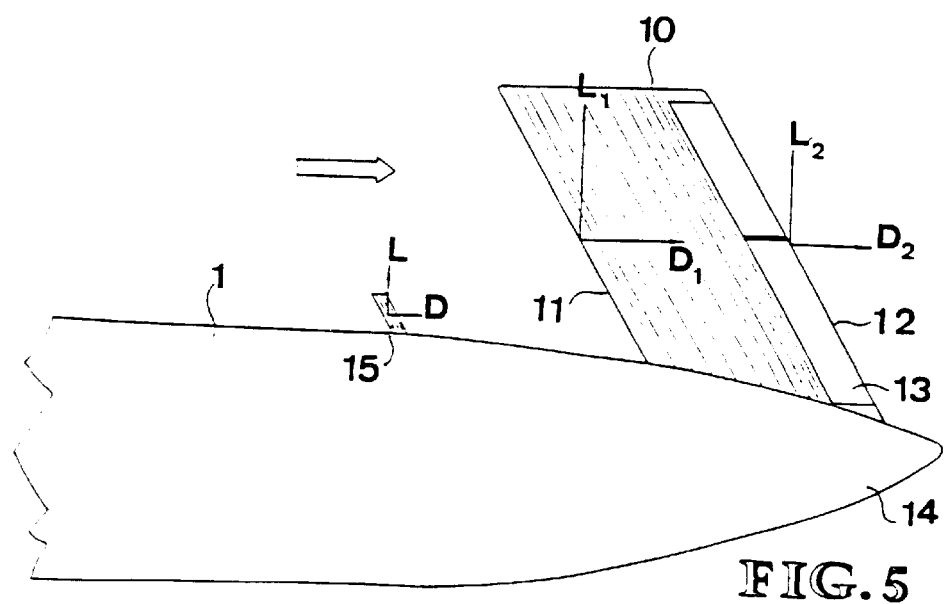

FIG. 5 consists of the fuselage 1, the fin unit 10, the lift $L_1$ and the resistance $D_1$ of the leading edge 11 and the lift $L_2$ and the resistance $D_2$ of its trailing edge 12 on the rudders 13, the tail 14, and the lift L and the resistance D of the antenna 15.

The arrows indicate the airflow.

What I claim is:

1. An aircraft lift arrangement having vertical fins or elements with a positive angle slope in relation to their forward edge or transverse axis both on the leading and trailing edges, both beginning at their upper front and descending in an incline rearward as far as their bases, to product an inclined force on said vertical element which is broken down into two components, one horizontal and rearward, providing resistance to the advance, and the other a vertical, ascendant or lift component.

2. The aircraft lift arrangement according to claim 1 wherein the vertical fins or elements are engine pylons.

3. The aircraft lift arrangement according to claim 1 wherein the fins or elements are lateral portions of their cowls.

4. The aircraft lift arrangement according to claim 1 wherein the vertical fins or elements are fin units.

5. The aircraft lift arrangement according to claim 1 wherein the vertical fins or elements are rocket mounts.

6. The aircraft lift arrangement according to claim 1 wherein the vertical fins or elements are launcher-tank mounts.

7. The aircraft lift arrangement according to claim 1 wherein the vertical fins or elements are aircraft float mounts.

8. The aircraft lift arrangement according to claim 1 wherein the vertical fins or elements are aircraft skis mounts.

9. The aircraft lift arrangement according to claim 1 wherein the vertical fins or elements are external cables and antennas.

10. The aircraft lift arrangement according to claim 1 wherein the vertical fins or elements are sideways sloping fins.

* * * * *